(12) United States Patent
Hui

(10) Patent No.: US 10,881,090 B2
(45) Date of Patent: Jan. 5, 2021

(54) SPINNING REEL

(71) Applicant: SHIMANO COMPONENTS (MALAYSIA) SDN. BHD., Johor (MY)

(72) Inventor: Chan Yik Hui, Johor (MY)

(73) Assignee: SHIMANO COMPONENTS (MALAYSIA) SDN. BHD., Johor (MY)

( * ) Notice: Subject to any disclaimer, the term of this patent is extended or adjusted under 35 U.S.C. 154(b) by 3 days.

(21) Appl. No.: 16/442,410

(22) Filed: Jun. 14, 2019

(65) Prior Publication Data
US 2020/0022349 A1 Jan. 23, 2020

(30) Foreign Application Priority Data

Jul. 19, 2018 (JP) .................................. 2018-135655

(51) Int. Cl.
*A01K 89/01* (2006.01)
*A01K 89/00* (2006.01)

(52) U.S. Cl.
CPC .... *A01K 89/011221* (2015.05); *A01K 89/006* (2013.01)

(58) Field of Classification Search
CPC ........ A01K 89/0111; A01K 89/011221; A01K 89/03
See application file for complete search history.

(56) References Cited

U.S. PATENT DOCUMENTS

| 2002/0096587 | A1* | 7/2002 | Ikuta ...................... A01K 89/00 242/319 |
| 2002/0170997 | A1 | 11/2002 | Furomoto |
| 2006/0231657 | A1* | 10/2006 | Morise ................... A01K 89/03 242/244 |
| 2015/0136889 | A1* | 5/2015 | Saito ..................... A01K 89/033 242/227 |
| 2016/0106083 | A1* | 4/2016 | Niitsuma ........... A01K 89/0192 242/310 |

FOREIGN PATENT DOCUMENTS

JP 2015-97492 A 5/2015

OTHER PUBLICATIONS

Search Report of corresponding GB Application No. 1909530.6 dated Dec. 19, 2019.

\* cited by examiner

*Primary Examiner* — Emmanuel M Marcelo
(74) *Attorney, Agent, or Firm* — Global IP Counselors, LLP

(57) ABSTRACT

A spinning reel includes a waterproofing structure disposed on one of first wall portion of a spool and a second wall portion of an adjustment member. The waterproofing structure is configured to prevent infiltration of water into an interior of the spool. The waterproofing structure has an annular convex portion protruding toward other one of the first wall portion of the spool and the second wall portion of the adjustment member, and an annular concave portion recessed in a direction away from other one of the first wall portion of the spool and the second wall portion of the adjustment member, and disposed on an outer side of the annular convex portion in the radial direction of the spool shaft.

7 Claims, 6 Drawing Sheets

SPINNING REEL

CROSS-REFERENCE TO RELATED APPLICATIONS

This application claims priority to Japanese Patent Application No. 2018-135655, filed on Jul. 19, 2018. The entire disclosure of Japanese Patent Application No. 2018-135655 is hereby incorporated herein by reference.

FIELD OF THE INVENTION

The present invention relates to a spinning reel for casting a fishing line in a forward direction.

BACKGROUND ART

A conventional spinning reel that generally comprises a drag mechanism for braking the rotation of the spool and an adjustment member for adjusting the drag force of the drag mechanism is known (refer to Japanese Laid-Open Patent Application No. 2015-97492). The drag mechanism is disposed in inside the spool, and the adjustment member is mounted on the spool shaft on the front side of the spool to be turnable. The drag force of the drag mechanism changes in accordance with the turning of the adjustment member. In addition, Japanese Laid-Open Patent Application No. 2015-97492 includes a seal member to prevent the infiltration of water into the drag mechanism from the gap between the adjustment member and the spool.

In Japanese Laid-Open Patent Application No. 2015-97492, water that intrudes from the gap between the adjustment member and the spool easily reaches the seal member. Because the probability that water will intrude into the drag mechanism increases with the amount of water that reaches the seal member, it is preferable that the amount of water that reaches the seal member be as small as possible.

In addition, in Japanese Laid-Open Patent Application No. 2015-97492, the water that intrudes from the gap between the adjustment member and the spool is not easily discharged to the outside. Consequently, for example, when the adjustment member is removed from the spool shaft, there is the possibility that the water that remains in the gap between the adjustment member and the spool will accidentally enter the interior of the spool.

SUMMARY

The object of the present invention is to prevent water from intruding into the interior of the spool from the gap between the adjustment member and the spool.

A spinning reel according to one aspect of the present invention is a spinning reel that can cast fishing line forward and comprises a reel body, a spool shaft, a spool, a drag mechanism, an adjustment member, and a waterproofing structure. The spool shaft extends in the longitudinal direction and is supported by the reel body. The spool has a bobbin trunk and a first wall portion, which is disposed on the front side of the bobbin trunk and has a larger diameter than the external diameter of the bobbin trunk, and is rotatably supported by the spool shaft. The drag mechanism is disposed on an inside of the spool and brakes the rotation of the spool. The adjustment member has a second wall portion, which faces the first wall portion of the spool in the axial direction of the spool shaft, and is adjustably mounted on the distal end of the spool shaft with a gap between the adjustment member and the spool; when tuned, the adjustment member adjusts the drag force of the drag mechanism. The waterproofing structure, disposed on at least one of the first wall portion of the spool and the second wall portion of the adjustment member, prevents the infiltration of water into the interior of the spool. The waterproofing structure comprises an annular convex portion protruding toward other one of the first wall portion and the second wall portion, and an annular concave portion recessed in a direction away from other one of the first wall portion and the second wall portion.

In such a spinning reel, for example, if the waterproofing structure is disposed on the first wall portion of the spool, water entering the spool from the gap between the spool and the adjustment member along the first wall portion of the spool enters the annular convex portion when the water crosses there. In addition, when the water that enters through the first wall portion of the spool passes over the annular concave portion, the infiltration of water is prevented by the annular convex portion. That is, it is possible to prevent the infiltration of water into the drag mechanism disposed inside the spool with the annular concave portion and the annular convex portion. If the waterproofing structure is disposed on the second wall portion of the adjustment member, the same effect as described above can be achieved with respect to the water that passes from the gap between the spool and the adjustment member to the first wall portion of the adjustment member.

In addition, when the first wall portion of the spool and the second wall portion of the adjustment member are oriented in the longitudinal direction, the annular concave portion acts as a flow path for water, and water entering the annular concave portion travels downward through the annular concave portion. The water that has moved into the annular concave portion then flows away from the center of the spool, which facilitates the discharge of water to the outside.

Preferably, the annular concave portion is disposed to be spaced apart from the annular convex portion in the radial direction. In this embodiment, the infiltration of water into the spool can be effectively prevented.

Preferably, the waterproofing structure has a sloped portion that is sloped frontwards and extends radially outwards. In this embodiment, the water that intrudes from the gap between the adjustment member and the spool is easily discharged to the outside.

Preferably, the spool further comprises a cover portion that extends forward from the first wall portion and covers the outer peripheral portion of the second wall portion of the adjustment member. In this embodiment, it is possible to prevent water from intruding from the radial direction.

Preferably, the adjustment member further comprises a cylindrical portion having an outer peripheral portion that is disposed to oppose the inner peripheral portion of the first wall portion of the spool, and a seal member that seals the gap between the inner peripheral portion of the first wall portion of the spool and the outer peripheral portion of the cylindrical portion of the adjustment member. In this embodiment, since the amount of water that reaches the seal member can be suppressed by the annular concave portion and the annular convex portion, the seal member can easily prevent the infiltration of water into the interior of the spool.

Preferably, the waterproofing structure is disposed on both the first wall portion of the spool and the second wall portion of the adjustment member. In this embodiment, the infiltration of water into the interior of the spool can be further prevented.

According to the present invention, it is possible to prevent the water from intruding inside the spool from the gap between the adjustment member and the spool.

DETAILED DESCRIPTION OF THE EMBODIMENTS

Figure 1:
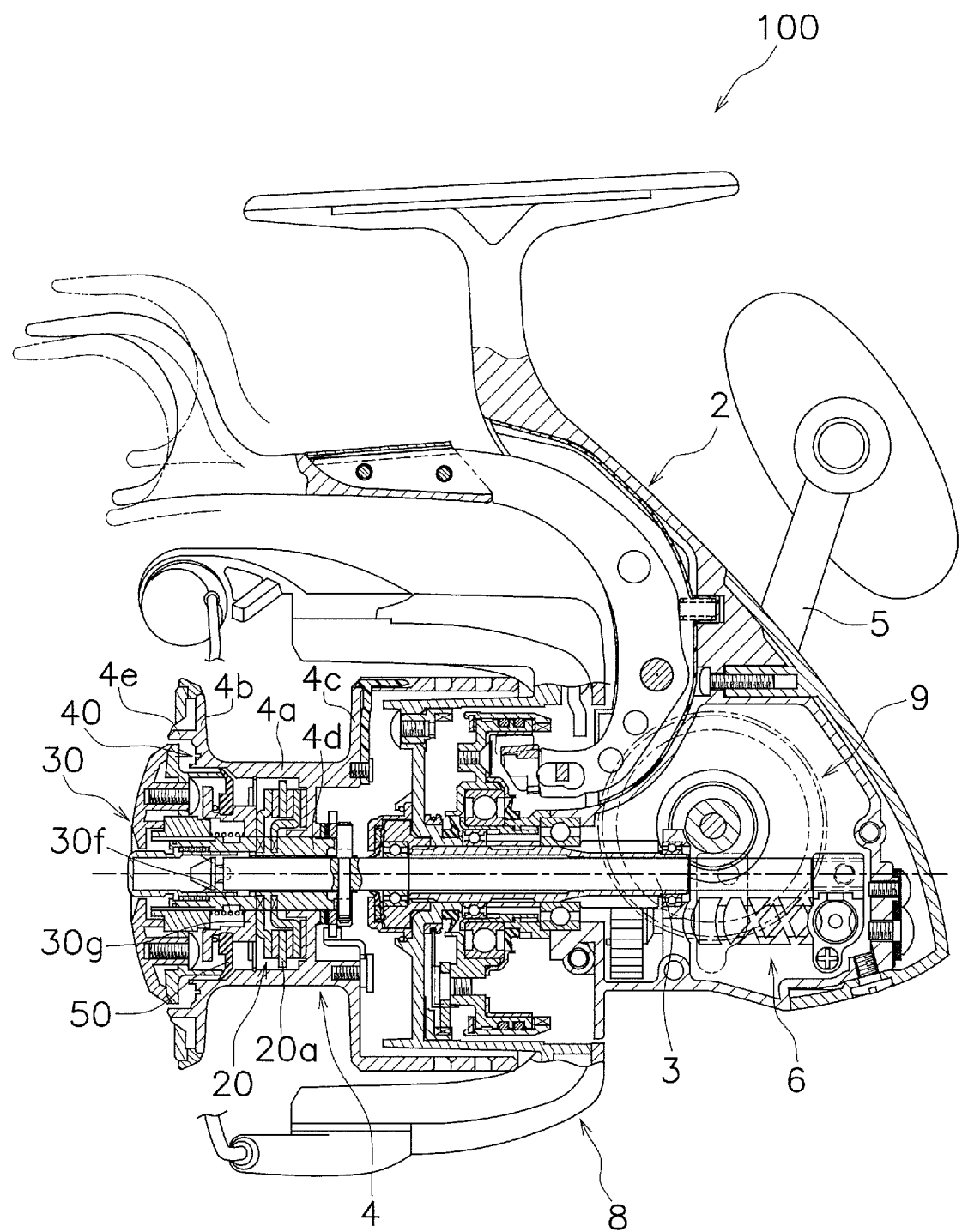
FIG. 1 is a side cross-sectional view of a spinning reel employing one embodiment of the present invention.

A spinning reel 100 employing one embodiment of the present invention can cast (unreel) fishing line in a forward direction. As shown in FIG. 1, the spinning reel 100 comprises a reel body 2, a spool shaft 3, a spool 4, a drag mechanism 20, an adjustment member 30, and a waterproofing structure 40. In addition, the spinning reel 100 preferably further comprises a seal member 50.

In the following description, the direction in which a fishing line is cast during fishing is referred to as the front, and the opposite direction is referred to as the rear. Further, left and right mean left and right when the spinning reel 100 is viewed from the rear. In addition, the direction in which the spool shaft 3 extends is referred to as the axial direction. And the direction orthogonal to the spool shaft 3 is referred to as the radial direction. Also, the direction around the axis of the spool shaft 3 is referred to as the circumferential direction.

As shown in FIG. 1, a handle 5 is disposed on the reel body 2 so as to be rotatable. The reel body 2 has an internal space within which a reciprocating mechanism 6 for uniformly winding fishing line about the spool 4 is housed, a rotor drive mechanism 9 that transmits the rotation of the handle 5 to the rotor 8, which is rotatably supported by the reel body 2, etc.

The spool shaft 3 extends in the front-rear direction and is supported by the reel body 2. Specifically, the spool shaft 3 is supported by the reel body 2 so as to be movable in the axial direction.

The spool shaft 3 passes axially through the center of the spool 4, which is rotatably supported by the spool shaft 3 at the distal end side of the spool shaft 3.

The spool 4 includes a bobbin trunk 4a, a first wall portion 4b (one example of a front flange portion), a rear flange portion 4c, and a spool cylinder 4d. In addition, the spool 4 preferably further includes a cover portion 4e.

The bobbin trunk 4a is formed in a cylindrical shape, and fishing line is wound around the outer periphery thereof. The bobbin trunk 4a has an internal space.

The first wall portion 4b extends in the radial direction on the front side of the bobbin trunk 4a. Specifically, the first wall portion 4b has a larger external diameter than that of the bobbin trunk 4a and extends radially outwardly farther than the bobbin trunk 4a.

The rear flange portion 4c extends in the radial direction on the rear side of the bobbin trunk 4a. More specifically, the rear flange portion 4c extends radially outwardly farther than the bobbin trunk 4a and has approximately the same external diameter as that of the first wall portion 4b.

Figure 2:
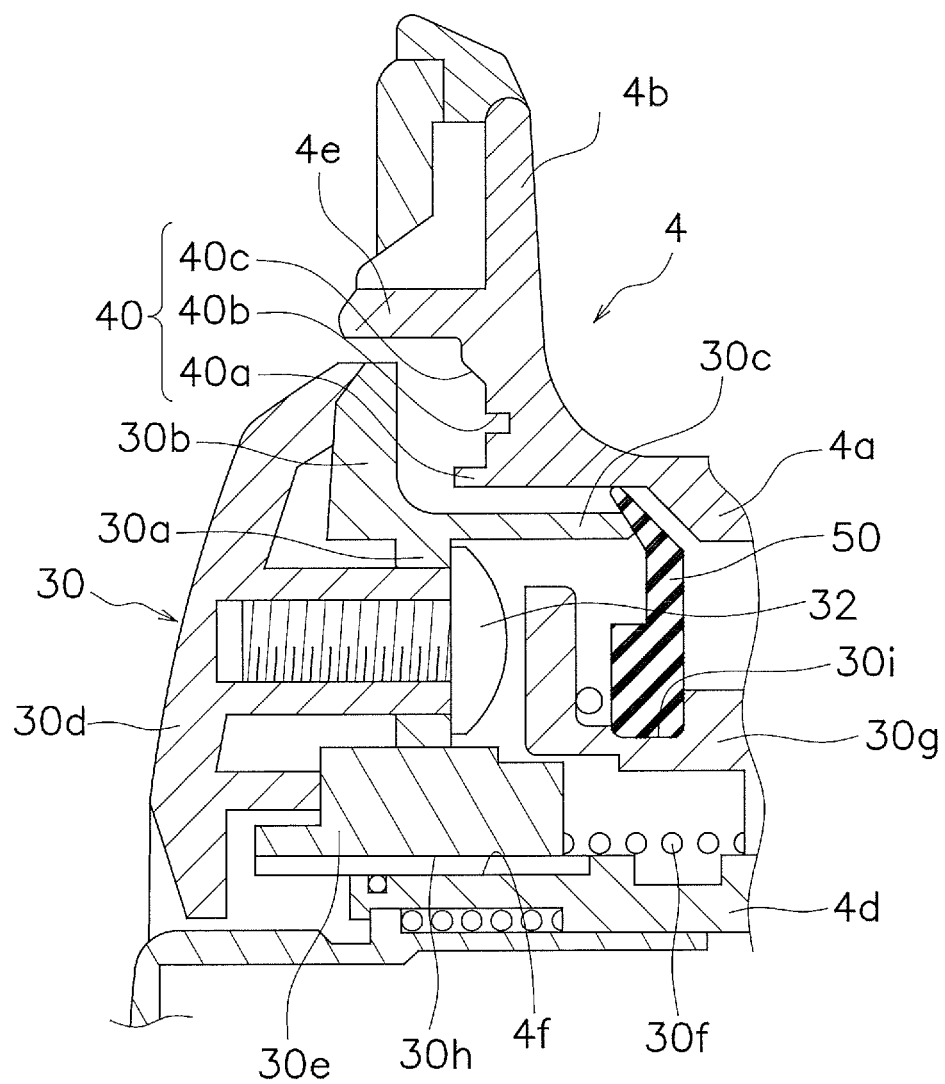
FIG. 2 is a partially enlarged cross-sectional view of a spool and an adjustment member.

The spool cylinder 4d is mounted on the spool shaft 3 so as to be non-rotatable and attachable/detachable. The spool 4 and the drag mechanism 20 are detachably mounted on the spool shaft 3 via the spool cylinder 4d. As shown in FIG. 2, the spool cylinder 4d has a male threaded portion 4f on the outer circumferential surface of the distal end.

The cover portion 4e extends forward from the first wall portion 4b in a cylindrical shape and covers the outer peripheral portion of a second wall portion 30b of the adjustment member 30, described further below. The cover portion 4e is integrally formed with the first wall portion 4b. The cover portion 4e may be formed separately from the first wall portion 4b.

As shown in FIG. 1, the drag mechanism 20 is disposed on the inside of the spool 4 and brakes the rotation of the spool 4. Specifically, the drag mechanism 20 is housed within the bobbin trunk 4a of the spool 4. The drag mechanism 20 has a plurality of friction members 20a. Since the drag mechanism 20 has a conventional configuration, a detailed description thereof is omitted.

The adjustment member 30 is adjustably mounted on the distal end of the spool shaft 3 and a gap is disposed between the adjustment member 30 and the spool 4. In the present embodiment, the adjustment member 30 is adjustably mounted on the distal end of the spool shaft 3 via the spool cylinder 4d. The drag force of the drag mechanism 20 can be adjusted by turning the adjustment member 30.

As shown in FIG. 2, the adjustment member 30 includes a knob body 30a, the second wall portion 30b, a cylindrical portion 30c, a knob portion 30d, a nut 30e, a spring member 30f, and a pressing member 30g.

The knob body 30a is circular and is tuneably mounted on the distal end of the spool shaft 3 via the nut 30e.

The second wall portion 30b is integrally formed with the knob body 30a and extends radially outwardly from the knob body 30a with an annular plate-like shape. The second wall portion 30b faces the first wall portion 4b of the spool 4 in the axial direction. More specifically, the second wall portion 30b is disposed in front of the first wall portion 4b with a gap formed between the second wall portion 30b and the first wall portion 4b in the axial direction. The radially outward side of the second wall portion 30b is covered by the cover portion 4e of the spool 4. There is a gap between the second wall portion 30b and the cover portion 4e in the radial direction, and the gap opens in a frontward direction.

The cylindrical portion 30c extends rearward from the knob body 30a with a cylindrical shape. The outer peripheral portion of the cylindrical portion 30c is disposed to oppose the inner peripheral portion of the first wall portion 4b of the spool 4. The cylindrical portion 30c is integrally formed with the knob body 30a. The rear end portion of the cylindrical portion 30c contacts the seal member 50.

The knob portion 30d is an operating portion for turning the adjustment member 30. The knob portion 30d extends in the radial direction and protrudes in the frontward direction from the knob body 30a. The knob portion 30d is fixed to the front portion of the knob body 30a by a screw member 32.

The nut 30e is housed in the inner peripheral portion of the knob body 30a so as to be relatively non-rotatable and to be relatively movable in the axial direction, with respect to the knob body 30a. A female threaded portion 30h is formed on the inner circumferential surface of the nut 30e, and the female threaded portion 30h is screwed onto the male threaded portion 4f of the spool cylinder 4d. The nut 30e thus rotates together with the adjustment member 30 in accordance with the rotation of the adjustment member 30 and moves along the spool cylinder 4d in the axial direction.

The spring member 30f is disposed between the nut 30e and the pressing member 30g in the axial direction. The spring member 30f is mounted on the outer peripheral portion of the spool cylinder 4d. The spring member 30f biases the pressing member 30g.

As shown in FIG. 1, the pressing member 30g is axially disposed between the adjustment member 30 and the plurality of friction members 20a. When the adjustment member 30 is adjusted, the nut 30e moves axially with respect to the spool cylinder 4d, and the force with which the spring member 30f presses against the pressing member 30g changes. Thus, the force with which the pressing member 30g presses against the plurality of friction members 20a changes, and the drag force of the drag mechanism 20 changes.

The waterproofing structure 40 is disposed on the first wall portion 4b of the spool 4 and/or the second wall portion 30b of the adjustment member 30, and prevents the infiltration of water into the spool 4. In the present embodiment, the waterproofing structure 40 is disposed on the first wall portion 4b of the spool 4. The waterproofing structure 40 prevents the water that enters from the gap between the cover portion 4e of the spool 4 and the second wall portion 30b of the adjustment member 30 from infiltrating into the spool 4 and hence the drag mechanism 20.

Figure 3:
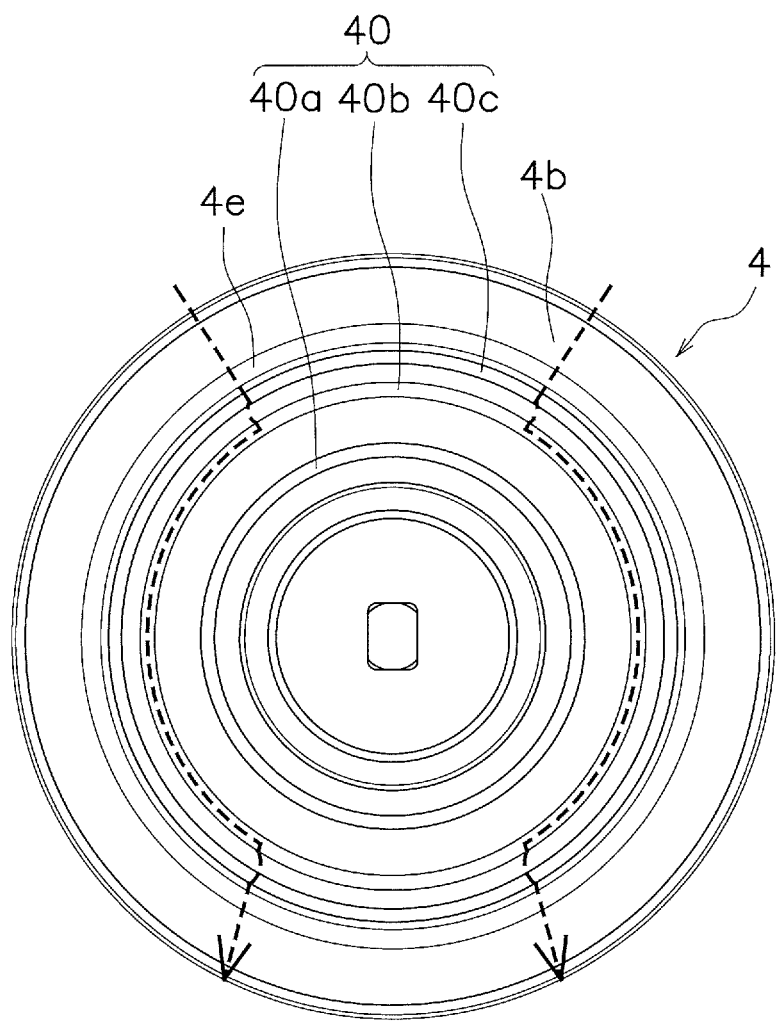
FIG. 3 is a frontal view of the spool.

As shown in FIGS. 2 and 3, the waterproofing structure 40 has an annular convex portion 40a and an annular concave portion 40b. In addition, the waterproofing structure 40 preferably further includes a sloped portion 40c. The annular convex portion 40a, the annular concave portion 40b, and the sloped portion 40c are formed radially inward of the cover portion 4e and on the front side of the first wall portion 4b.

The annular convex portion 40a protrudes axially from the first wall portion 4b of the spool 4 toward the second wall portion 30b of the adjustment member 30 and has an annular shape along the circumferential direction. The annular convex portion 40a projects from the inner edge of the first wall portion 4b.

In the first wall portion 4b of the spool 4, the annular concave portion 40b is recessed in a direction away from the second wall portion 30b of the adjustment member 30, and has an annular shape along the circumferential direction. In the present embodiment, the annular concave portion 40b is axially recessed from front to rear in a position opposite the second wall portion 30b in the axial direction. The annular concave portion 40b is disposed radially outwardly farther than the annular convex portion 40a. The annular concave portion 40b is preferably disposed spaced apart from the annular convex portion 40a in the radial direction.

The sloped portion 40c slopes in the frontward direction and extends radially outwards. The sloped portion 40c is disposed radially outward of the annular concave portion 40b and radially inward of the cover portion 4e of the spool 4.

The seal member 50 seals the gap between the spool 4 and the adjustment member 30. More specifically, the seal member 50 seals the gap between the inner peripheral portion of the first wall portion 4b of the spool 4 and the outer peripheral portion of the cylindrical portion 30c of the adjustment member 30. The seal member 50 is a lip seal in which the distal end is sloped in the frontward direction and is mounted in a mounting groove 30i disposed on the outer circumferential surface of the pressing member 30g. The seal member 50 is disposed such that the distal end contacts the inner peripheral portion of the first wall portion 4b and a part of the front surface contacts the rear end portion of the cylindrical portion 30c of the adjustment member 30.

In the spinning reel 100 configured as described above, water that enters the spool 4 from the gap between the cover portion 4e of the spool 4 and the second wall portion 30b of the adjustment member 30 along the cover portion 4e and the first wall portion 4b enters the annular concave portion 40b when the water crosses the annular concave portion 40b, thereby suppressing the infiltration of water. In addition, when the water passes over the annular concave portion 40b, the annular convex portion 40a prevents the infiltration of water.

In addition, as shown in FIG. 3, when the first wall portion 4b of the spool 4 and the second wall portion 30b of the adjustment member 30 are oriented in the front-rear direction, the annular concave portion 40b acts as a flow path for water, and the water entering the annular concave portion 40b travels downward through the annular concave portion 40b. The water that has moved into the annular concave portion 40b then flows away from the center of the spool 4, as indicated by the broken line in FIG. 3, which facilitates the discharge of water to the outside. In addition, the sloped portion 40c facilitates the guiding of the water that flows through the annular concave portion 40b to the outside.

Other Embodiments

One embodiment of the present invention was described above, but the present invention is not limited to the above-described embodiment; various modifications can be made without departing from the scope of the invention.

Figure 4:
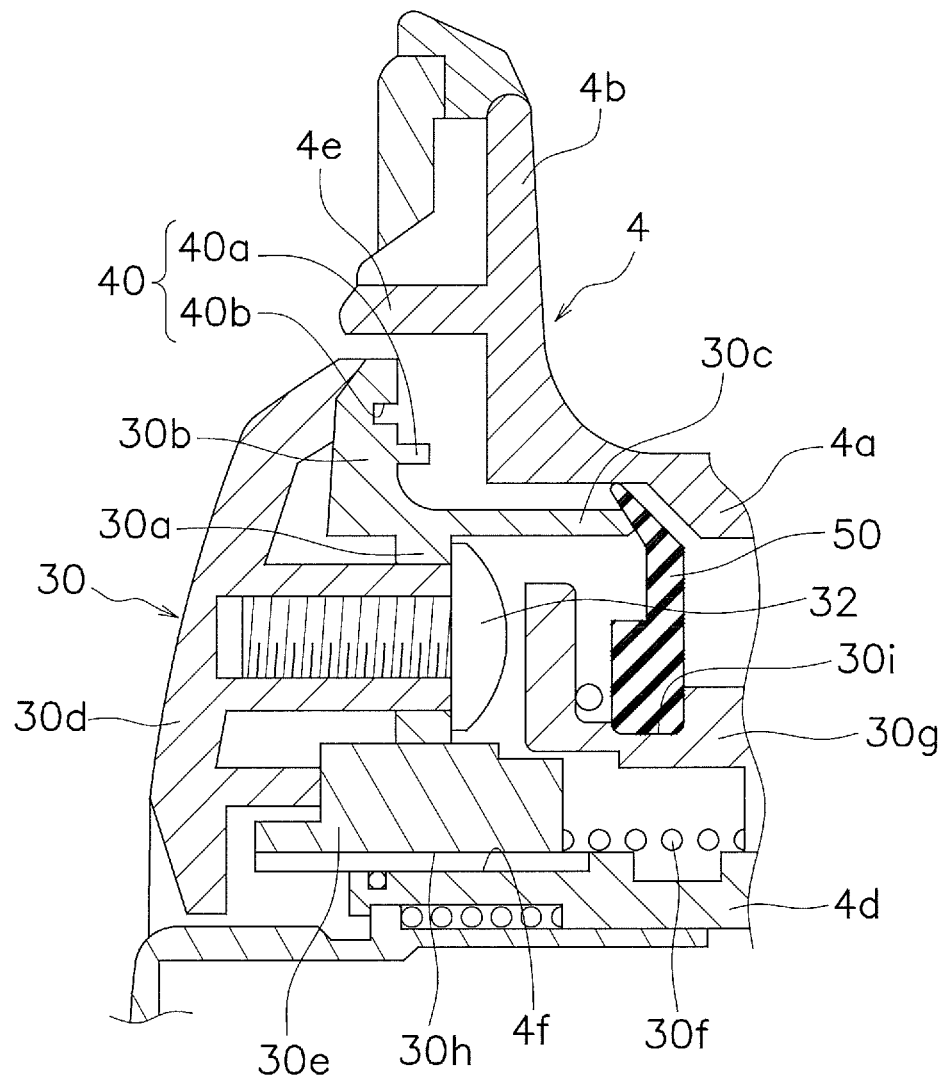
FIG. 4 is a partially enlarged cross-sectional view of the spool and the adjustment member according to another embodiment.

In the above embodiment, the waterproofing structure 40 is disposed on the first wall portion 4b of the spool 4, but, as shown in FIG. 4, the waterproofing structure 40 may also be disposed on the second wall portion 30b of the adjustment member 30. In this embodiment, the annular convex portion 40a axially protrudes from the second wall portion 30b of the adjustment member 30 toward the first wall portion 4b of the spool 4. In addition, the annular concave portion 40b is disposed on the second wall portion 30b, so as to be recessed in a direction away from the first wall portion 4b of the spool 4.

Figure 5:
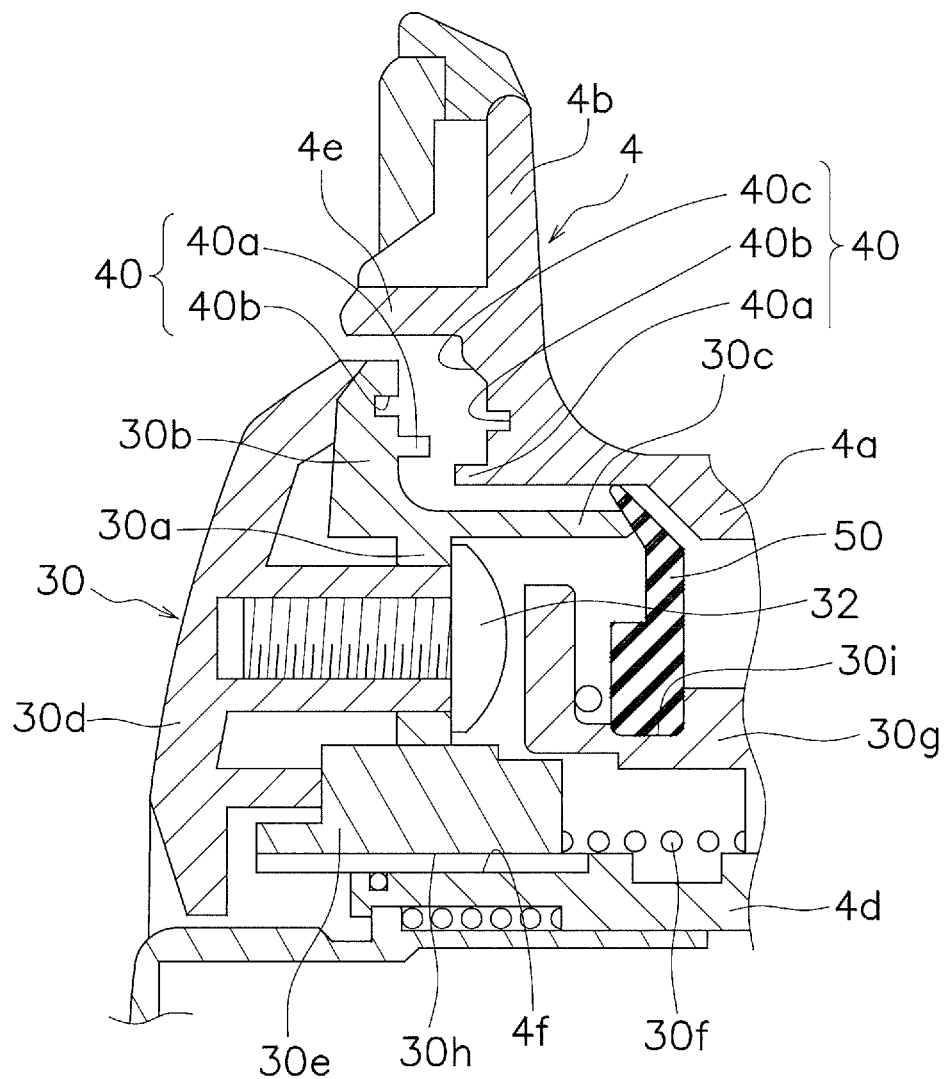
FIG. 5 is a partially enlarged cross-sectional view of the spool and the adjustment member according to another embodiment.

In addition, as shown in FIG. 5, the waterproofing structure 40 may be disposed on both the first wall portion 4b of the spool 4 and the second wall portion 30b of the adjustment member 30.

Figure 6:
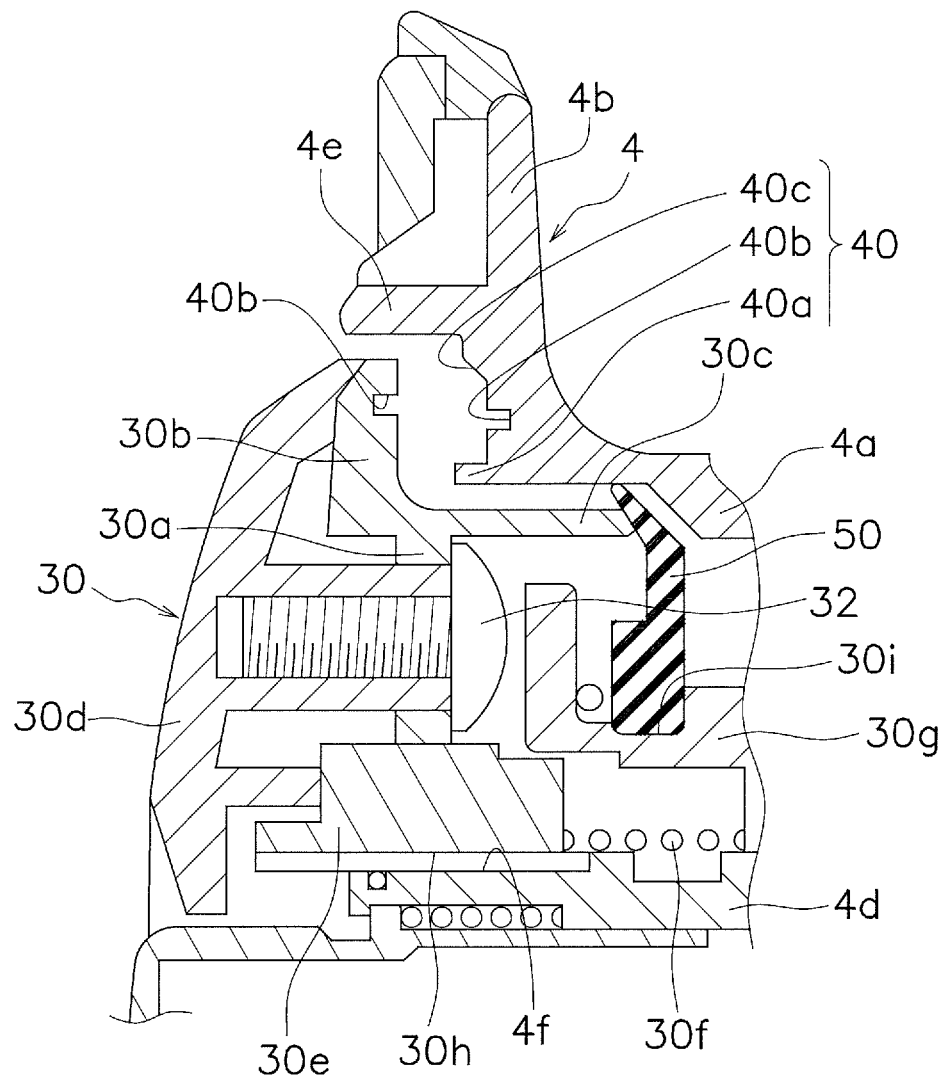
FIG. 6 is a partially enlarged cross-sectional view of the spool and the adjustment member according to another embodiment.

In addition, as shown in FIG. 6, the waterproofing structure 40 may be disposed on the first wall portion 4b of the spool 4 and just the annular concave portion 40b may also be disposed on the second wall portion 30b of the adjustment member 30. In addition, a plurality of the annular concave portions 40b may be disposed on the first wall portion 4b and/or the second wall portion 30b.

What is claimed is:

1. A spinning reel for casting a fishing line, comprising:
   a reel body;
   a spool shaft extending in a longitudinal direction and supported by the reel body;
   a spool rotatably supported by the spool shaft, the spool having a bobbin trunk and a first wall portion which disposed on a front side of the bobbin trunk and having a larger diameter than an external diameter of the bobbin trunk, and;

a drag mechanism disposed on an inside of the spool and configured to brake rotation of the spool;

an adjustment member having a second wall portion facing the first wall portion of the spool in the longitudinal direction of the spool shaft, and being adjustably mounted on a distal end of the spool shaft, a gap being disposed between the adjustment member and the spool, and the adjustment member being configured to adjust drag force of the drag mechanism when adjusted; and a waterproofing structure disposed on one of the first wall portion of the spool and the second wall portion of the adjustment member, the waterproofing structure configured to prevent infiltration of water into an interior of the spool, the waterproofing structure having an annular convex portion extending from a surface of the one of the first wall portion of the spool and the second wall portion of the adjustment member and protruding toward the other one of the first wall portion of the spool and the second wall portion of the adjustment member, and an annular concave portion that is a recess within a surface of the one of the first wall portion of the spool and the second wall portion of the adjustment member, is recessed away from the other one of the first wall portion of the spool and the second wall portion of the adjustment member, and disposed on an outer side of the annular convex portion in a radial direction of the spool shaft.

2. The spinning reel according to claim 1, wherein the annular concave portion is disposed spaced apart from the annular convex portion in the radial direction.

3. The spinning reel according to claim 1, wherein the waterproofing structure further has a sloped portion that slopes in a forward direction and extends radially outwards.

4. The spinning reel according to claim 1, wherein the spool further comprises a cover portion that extends forward from the first wall portion and covers the outer peripheral portion of the second wall portion of the adjustment member.

5. The spinning reel according to claim 1, wherein the adjustment member further comprises a cylindrical portion having an outer peripheral portion disposed opposite an inner peripheral portion of the first wall portion of the spool, and a seal member configured to seal a gap between the inner peripheral portion of the first wall portion of the spool and the outer peripheral portion of the cylindrical portion of the adjustment member.

6. The spinning reel according to claim 1, wherein the waterproofing structure is disposed on both the first wall portion of the spool and the second wall portion of the adjustment member.

7. The spinning reel according to claim 1, wherein the waterproofing structure is further disposed on the other one of the first wall portion of the spool and the second wall portion of the adjustment member, the waterproofing structure configured to prevent infiltration of water into the interior of the spool, the waterproofing structure having the annular convex portion protruding toward the one of the first wall portion of the spool and the second wall portion of the adjustment member, and the annular concave portion recessed in a direction away from the one of the first wall portion of the spool and the second wall portion of the adjustment member, and disposed on the outer side of the annular convex portion in a radial direction of the spool shaft.

* * * * *